US012785154B2

(12) United States Patent
Yoo et al.

(10) Patent No.: US 12,785,154 B2
(45) Date of Patent: Nov. 3, 2026

(54) ELECTRODE INSULATING COATING COMPOSITION AND ELECTRODE USING THE SAME

(71) Applicant: LG ENERGY SOLUTION, LTD., Seoul (KR)

(72) Inventors: Houng Sik Yoo, Daejeon (KR); Dong Hyun Kim, Daejeon (KR); Sang Hoon Choy, Daejeon (KR); Hyeon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 605 days.

(21) Appl. No.: 18/275,909

(22) PCT Filed: Oct. 31, 2022

(86) PCT No.: PCT/KR2022/016843
§ 371 (c)(1),
(2) Date: Aug. 4, 2023

(87) PCT Pub. No.: WO2023/075553
PCT Pub. Date: May 4, 2023

(65) Prior Publication Data

US 2024/0120556 A1 Apr. 11, 2024

(30) Foreign Application Priority Data

Nov. 1, 2021 (KR) ........................ 10-2021-0148086

(51) Int. Cl.
*H01M 10/42* (2006.01)
*H01M 4/04* (2006.01)
*H01M 4/62* (2006.01)

(52) U.S. Cl.
CPC ..... *H01M 10/4235* (2013.01); *H01M 4/0404* (2013.01); *H01M 4/623* (2013.01)

(58) Field of Classification Search
None
See application file for complete search history.

(56) References Cited

U.S. PATENT DOCUMENTS

2016/0329547 A1 11/2016 Jin et al.
2020/0020910 A1 1/2020 Nam et al.
(Continued)

FOREIGN PATENT DOCUMENTS

CN 109891633 A 6/2019
CN 110785871 A 2/2020
(Continued)

OTHER PUBLICATIONS

Office Action issued on Jun. 18, 2025 in corresponding Korean Patent Application No. 10-2021-0148086.
(Continued)

*Primary Examiner* — Scott J. Chmielecki
(74) *Attorney, Agent, or Firm* — Morgan, Lewis & Bockius LLP

(57) ABSTRACT

An electrode insulating coating composition according to the present invention includes boehmite particles, a dispersant, a binder, and a solvent, wherein the dispersant includes two or more fatty acid compounds, and is included in an amount of 1.2 to 8.8 parts by weight with respect to 100 parts by weight of the boehmite particles.

12 Claims, 1 Drawing Sheet

(56) References Cited

U.S. PATENT DOCUMENTS

| | | | | |
|---|---|---|---|---|
| 2020/0212444 | A1 | 7/2020 | Lee et al. | |
| 2020/0220157 | A1 | 7/2020 | Toshiro et al. | |
| 2020/0350540 | A1 | 11/2020 | Han et al. | |
| 2021/0036289 | A1 | 2/2021 | Kim et al. | |
| 2021/0074984 | A1 | 3/2021 | Lee et al. | |
| 2021/0194043 | A1 | 6/2021 | Kifune | |
| 2021/0288383 | A1* | 9/2021 | Hong | H01M 10/0525 |
| 2023/0402610 | A1 | 12/2023 | Lee et al. | |

FOREIGN PATENT DOCUMENTS

| | | | |
|---|---|---|---|
| CN | 112335088 | A | 2/2021 |
| CN | 112701243 | A | 4/2021 |
| CN | 113372772 | A | 9/2021 |
| CN | 113410421 | A | 9/2021 |
| EP | 3 671 888 | A1 | 6/2020 |
| JP | 2016-066454 | A | 4/2016 |
| JP | 2018-035350 | A | 3/2018 |
| JP | 2021-153046 | A | 9/2021 |
| KR | 10-2018-0064361 | A | 6/2018 |
| KR | 10-2019-0022125 | A | 3/2019 |
| KR | 10-2019-0083625 | A | 7/2019 |
| KR | 10-2019-0089385 | A | 7/2019 |
| KR | 10-2019-0129623 | A | 11/2019 |
| KR | 10-2020-0026539 | A | 3/2020 |
| KR | 10-2096411 | B1 | 4/2020 |
| KR | 10-2020-0050791 | A | 5/2020 |
| KR | 10-2144878 | B1 | 8/2020 |
| KR | 10-2021-0091405 | A | 7/2021 |
| KR | 10-2021-0114285 | A | 9/2021 |

OTHER PUBLICATIONS

Extended European Search Report issued on Feb. 14, 2025 in European Patent Application No. 22887747.8.

International Search Report (with partial translation) and Written Opinion dated Feb. 7, 2023, for corresponding International Patent Application No. PCT/KR2022/016843.

Office Action issued on Jun. 18, 2026 in corresponding Chinese Patent Application No. 202280014200.5.

* cited by examiner

ELECTRODE INSULATING COATING COMPOSITION AND ELECTRODE USING THE SAME

TECHNICAL FIELD

Cross-Reference to Related Applications

The present application claims the benefit of the priority of Korean Patent Application No. 10-2021-0148086, filed on Nov. 1, 2021, which is hereby incorporated by reference in its entirety.

Technical Field

The present invention relates to an electrode insulating coating composition and an electrode using the same, and more particularly, to an electrode insulating coating composition prepared by adding boehmite particles and a dispersant containing two or more fatty acid compounds, and an electrode using the same.

Background Art

In recent years, there has been a dramatic increase in demand for batteries as energy sources with the technical development and increase in demand for mobile devices, and research on batteries capable of meeting various requirements has been conducted accordingly. In particular, research on a lithium secondary battery having a high energy density and also exhibiting excellent lifespan and cycle characteristics as a power source for such devices has been actively conducted.

A lithium secondary battery includes a positive electrode including a positive electrode active material enabling intercalation/deintercalation of lithium ions, a negative electrode including a negative electrode active material enabling intercalation/deintercalation of lithium ions, a separator interposed between the positive electrode and the negative electrode, and an electrolyte. The positive electrode and the negative electrode have a structure in which an electrode active material layer is formed on one surface or both surfaces of an electrode collector, and recently, a technique of forming an insulating layer on an outer portion of the electrode active material layer is under development to increase stability of an electrode. The forming of an insulating layer on the outer portion of the electrode active material layer may protect the electrode active material layer from heat generated upon driving of the electrode and increase insulation between electrodes.

Typical electrode insulating layers are generally formed using a binder having insulating properties. However, the binder has poor heat resistance, and accordingly, the typical insulating layers formed of the binder have reduced adhesion at high temperature for battery driving, and thus batteries have lower safety. To overcome the limitations, a technique of improving heat resistance of an insulating layer by adding inorganic particles to an electrode insulating coating composition has been proposed.

However, electrode insulating coating compositions including inorganic particles proposed to date have a limitation in that dispersibility of the inorganic particles is not sufficient. When the inorganic particles are not dispersed well in a coating composition, the inorganic particles precipitate in a lower portion of the coating composition, and accordingly, the inorganic particles are prevented from being uniformly distributed in an insulating layer after forming the insulating layer, thereby causing less improvement in heat resistance. In addition, in this case, the inorganic particles are intensively distributed in a lower portion of the insulating layer to reduce an amount of a binder place in the lower portion of the insulating layer, thereby causing the insulating layer to be easily deintercalated from an electrode. Furthermore, when the inorganic particles are not effectively dispersed, the inorganic particles aggregate to form particles having a large particle diameter to increase viscosity of a composition, thereby causing the insulating layer to have an uneven thickness and/or surface. Accordingly, insulation performance of the insulating layer is deteriorated to lower safety of batteries.

Therefore, there is a need for a technique capable of uniformly dispersing the inorganic particles in the insulating layer.

DISCLOSURE OF THE INVENTION

Technical Problem

An aspect of the present invention provides an electrode insulating coating composition having improved dispersibility of inorganic particles, an insulating coating layer having excellent coatability and adhesion, and an electrode including the insulating coating layer.

The objective of the present invention is not limited to the aforesaid, but other objectives not described herein will be clearly understood by those skilled in the art from descriptions below.

Technical Solution

According to an aspect of the present invention, there is provided an electrode insulating coating composition including boehmite particles, a dispersant, a binder, and a solvent, wherein the dispersant includes two or more fatty acid compounds, and is included in an amount of 1.2 to 8.8 parts by weight with respect to 100 parts by weight of the boehmite particles.

According to another aspect of the present invention, there is provided an electrode including a collector, an electrode active material layer, and an insulating coating layer, wherein the electrode active material layer and the insulating coating layer are disposed on the collector, and the insulating coating layer is formed from the electrode insulating coating composition according to any one of claims 1 to 10.

Advantageous Effects

An electrode insulating coating composition according to the present invention includes boehmite particles having excellent heat resistance. Accordingly, when an electrode insulating coating layer is formed using the electrode insulating coating composition of the present invention, excellent insulation performance may be maintained even at high temperature, and battery safety may thus be further improved.

In addition, when boehmite particles are used as inorganic particles as in the present invention, adhesion to an electrode may be excellent even after electrolyte impregnation to effectively prevent deintercalation of an insulating coating layer.

In addition, the electrode insulating coating composition according to the present invention includes two or more fatty acid compounds as a dispersant to improve dispersibility of boehmite particles, thereby providing low viscosity, excellent storage stability, and coatability.

An insulating coating layer formed from the electrode insulating coating composition of the present invention may maintain excellent insulating performance even at high temperature, and have excellent adhesion to an electrode even after electrolyte impregnation, thereby further improving battery safety.

MODE FOR CARRYING OUT THE INVENTION

Figure 1:
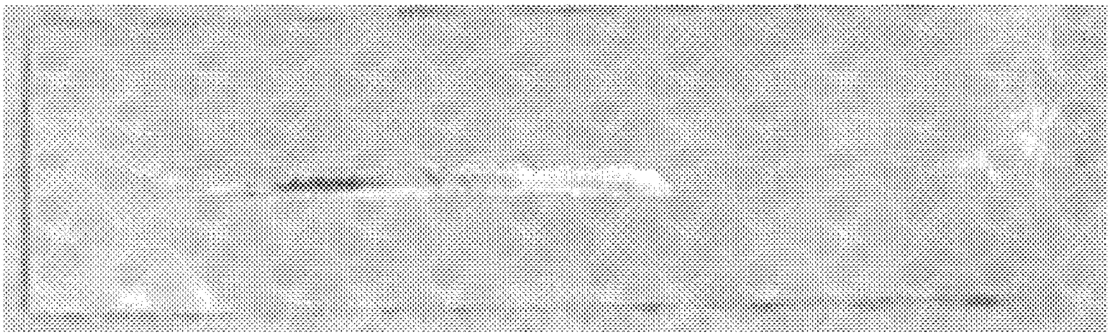
FIG. 1 is an image showing a state of an insulating coating layer formed using an electrode insulating coating composition of Example 2 after electrolyte impregnation.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals denote like elements throughout specification.

Unless otherwise defined, all terms (including technical and scientific terms) used herein have the same meaning as commonly understood by one of ordinary skill in the art to which the present invention belongs. Terms as defined in a generally used dictionary are not construed ideally or excessively unless defined apparently and specifically.

Terms used herein are not for limiting the present invention but for describing the embodiments. In this specification, the singular forms include the plural forms as well, unless the context clearly indicates otherwise. The meaning of "comprises" and/or "comprising" used in the specification does not exclude the presence or addition of other components besides a mentioned component.

In this specification, when an element "includes" a component, it may indicate that the element does not exclude another component unless explicitly described to the contrary, but can further include another component.

In this specification, the description "A and/or B" refers to A or B, or A and B.

In this specification, "%" refers to wt % unless indicated otherwise.

The term "average particle diameter ($D_{50}$)" as used herein may be defined as a particle diameter at a cumulative volume of 50% in a particle size distribution curve of particles. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

Electrode Insulating Coating Composition

An electrode insulating coating composition according to an embodiment of the present invention includes boehmite ($\gamma$-AlO(OH)) particles, a dispersant, a binder, and a solvent, and the dispersant includes two or more fatty acid compounds, and is included in an amount of 1.2 to 8.8 parts by weight with respect to 100 parts by weight of the boehmite particles.

Hereinafter, each component of the electrode insulating coating composition according to the present invention will be described.

(1) Boehmite Particles

Boehmite particles are included in an electrode insulating coating composition to increase heat resistance of an insulating coating layer. Inorganic particles such as boehmite do not soften or melt even at high temperature, for example, 900° C. or higher, and accordingly, when the inorganic particles are included in an electrode insulating layer, electrode insulating properties may be maintained even at quite high temperature.

When boehmite particles are used as the inorganic particles, adhesion to a collector after electrolyte impregnation is greater than a case where other inorganic particles (e.g., alumina) are used. This effect is believed to be due to the influence of a hydroxy group included in boehmite.

According to an embodiment of the present invention, $D_{50}$ of the boehmite particles before being dissolved in the solvent may be 0.1 μm to 1.0 μm, preferably 0.1 μm to 0.7 μm, more preferably 0.1 μm to 0.5 μm. When the $D_{50}$ of the boehmite particles before dissolution satisfies the above range, aggregation of the boehmite particles in a composition may be minimized to form an insulating coating layer having a uniform thickness and surface.

The boehmite particles may be included in an amount of to 25 parts by weight, preferably 10 to 20 parts by weight, and more preferably 15 to 20 parts by weight, with respect to 100 parts by weight of the insulating coating composition. When the amount of the boehmite particles satisfies the above range, aggregation of the boehmite particles may be minimized to properly maintain viscosity of an insulating coating composition and form an insulating coating layer having a uniform thickness and surface.

(2) Dispersant

A dispersant is for improving dispersibility of boehmite particles in an electrode insulating coating composition.

In the present invention, the dispersant includes two or more fatty acid compounds.

Preferably, the dispersant may include two or more fatty acids having different carbon numbers. In this case, the fatty acid compound layer may have greater density and thickness to show a greater effect of dispersibility improvement. In this case, although all fatty acid compounds included in the dispersant may have different carbon numbers, this does not necessarily indicate that all fatty acid compounds are required to be fatty acid compounds having different carbon numbers. For example, when the dispersant includes three or more fatty acid compounds, and the two fatty acid compounds have different carbon numbers, the other fatty acid compounds may be different kinds of fatty acid compounds having the same carbon number as any one of the two fatty acid compounds above.

According to an embodiment of the present invention, the dispersant may include a C15 to C30 unsaturated fatty acid compound and a C15 to C30 saturated fatty acid compound. That is, the dispersant may be a mixture of at least one of C15 to C30 unsaturated fatty acid compounds and at least one of C15 to C30 saturated fatty acid compounds. In another embodiment, the dispersant may include only two or more unsaturated fatty acid compounds, or may include only two or more saturated fatty acid compounds.

The C15 to C30 unsaturated fatty acid compounds may be selected from the group consisting of oleic acid ($C_{18}H_{34}O_2$), palmitoleic acid ($C_{16}H_{30}O_2$), cis-heptadecenoic acid ($C_{17}H_{32}O_2$), vaccenic acid ($C_{18}H_{34}O_2$), elaidic acid ($C_{18}H_{34}O_2$), linolenic acid ($C_{18}H_{32}O_2$), arachidonic acid ($C_{20}H_{32}O_2$), eicosanoic acid ($C_{20}H_{40}O_2$) erucic acid ($C_{22}H_{42}O_2$), eicosapentaenoic acid (EPA, $C_{20}H_{30}O_2$), docosahexaenoic acid (DHA, $C_{22}H_{32}O_2$), and nervonic acid ($C_{24}H_{46}O_2$).

The C15 to C30 saturated fatty acid compounds may be selected from the group consisting of palmitic acid ($C_{16}H_{32}O_2$), stearic acid ($C_{18}H_{36}O_2$), arachidic acid ($C_{20}H_{40}O_2$), behenic acid ($C_{22}H_{44}O_2$), and lignoceric acid ($C_{24}H_{48}O_2$).

According to an embodiment of the present invention, the dispersant may include oleic acid, stearic acid, palmitic acid, and nervonic acid.

The oleic acid is a C18 unsaturated fatty acid, which may be represented by Formula $C_{18}H_{34}O_2$, and is a monounsaturated fatty acid having one double bond between carbon atoms, and single bonds between the remaining carbon atoms.

The nervonic acid is a C24 unsaturated fatty acid, which is represented by an elongation product of oleic acid, and may be a monounsaturated fatty acid including one double bond between carbon atoms and single bonds between the remaining carbon atoms, like oleic acid.

The stearic acid is a C18 saturated fatty acid, which may be represented by Formula $C_{18}H_{36}02$.

The palmitic acid is a C16 saturated fatty acid, which may be represented by Formula $C_{16}H_{32}02$.

For example, the dispersant may include a mixture of fatty acid compounds in which oleic acid, stearic acid, palmitic acid, and nervonic acid are mixed in a weight ratio of (5 to 25):(5 to 25):(5 to 25):(5 to 25), preferably (5 to 15) (5 to 15) (5 to 15):(5 to 15), more preferably (9 to 10) (9 to 10) (9 to 10):(8 to 9). The dispersant including the mixture of fatty acid compounds as described above forms a uniform and dense fatty acid compound layer on a surface of boehmite particles, and may thus further improve dispersibility of the boehmite particles.

According to the inventors' research, it is shown that when two or more saturated fatty acid compounds are used as a dispersant in a composition containing boehmite particles, dispersibility of boehmite particles is significantly improved, and viscosity and time elapsing changes of an electrode insulating coating composition are remarkably improved.

This effect is believed to be due to steric hindrance and electrostatic repulsion between fatty acid compounds forming a layer on the surface of boehmite particles through adsorption of hydrocarbon moieties constituting the fatty acid compounds to the surface of the boehmite particle.

However, when only one fatty acid compound was used as a dispersant, there was no effect of preventing aggregation of boehmite particles, and rather, aggregation of the boehmite particles was greater than a case where no dispersant was used. Specifically, when a dispersant containing only one fatty acid compound is used, a fatty acid compound layer is formed but is not uniformly formed to induce greater aggregation between inorganic particles than a case where the fatty acid compound is not used as a dispersant.

Meanwhile, the dispersant may be included in an amount of 1.2 to 8.8 parts by weight, preferably 1.2 to 7.6 parts by weight, and more preferably 1.4 to 7.0 parts by weight, with respect to 100 parts by weight of the boehmite particles. When the amount of the dispersant is out of the above range, coatability of an insulating coating layer and adhesion to an electrode may be deteriorated. Specifically, when the dispersant is included in an amount of less than 1.2 parts by weight with respect to 100 parts by weight of the boehmite particles, boehmite particles may not be sufficiently dispersed in a composition to prevent a coating process from being performed through aggregated particles, or even when coating is available, particles may not be formed uniformly to cause line defects. In addition, when the dispersant is included in an amount of greater than 8.8 parts by weight with respect to 100 parts by weight of the boehmite particles, craters may be generated by bubbles upon forming a coating layer, and after electrolyte impregnation, adhesion between an insulating coating layer and a collector may be deteriorated to cause deintercalation of an insulating coating layer.

(3) Binder

Next, the binder is used to attach an insulating coating layer to a collector and/or an electrode active material layer.

The binder may be formed of a compound of a component that is not easily dissolved through an electrolyte of a secondary battery.

Any polymer binders used in the art may be used as the binder, and the type thereof is not particularly limited, and as typical examples thereof, an aqueous or non-aqueous polymer including a single material or a mixture of two or more materials selected from the group consisting of polyvinylidene fluoride (PVdF), polyvinylidene fluoride-hexafluoropropylene, polyvinyl pyrrolidone, polyacrylonitrile, polyvinylidene fluoride-trichlorethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethylpullulan, cyanoethyl polyvinyl alcohol, cyanoethylcellulose, cyanoethyl sucrose, pullulan, carboxymethylcellulose, styrene butadiene rubber (SBR), acrylonitrile styrene butadiene copolymer, and polyimide. Among the above, polyvinylidene fluoride (PVdF) is particularly preferable.

The binder may be included in an amount of 1 to 5 parts by weight, preferably 1 to 3 parts by weight, and more preferably 1.5 to 3 parts by weight, with respect to 100 parts by weight of the electrode insulating coating composition. When the amount of the binder satisfies the above range, adhesion between an insulating coating layer and an electrode is excellent.

(4) Solvent

Next, the solvent is used to dissolve the boehmite particles, the dispersant, and the binder to secure coatability of an insulating coating layer formed of the composition.

The solvent is preferably a solvent capable of dissolving the boehmite particles, the dispersant, and the binder at a certain level or higher, and having non-solvent properties for the electrode active material layer.

Specifically, as the solvent, any one or a mixture of two or more of acetone, tetrahydrofuran, acetonitrile, dimethylformamide, dimethylsulfoxide, dimethylacetamide, and N-methyl-2-pyrrolidone (NMP) may be used. Among the above, N-methyl-2-pyrrolidone (NMP) suitable for dissolving non-aqueous binders (e.g., polyvinylidene fluoride) is particularly preferable.

The solvent may be included in an amount that allows the composition to have a proper viscosity in consideration of coatability of the composition, and for example, the solvent may be included in an amount of 70 to 90 parts by weight, preferably 75 to 85 parts by weight, with respect to 100 parts by weight of the composition. Preferably, the electrode insulating coating composition according to the present invention may have a solid content of 10 wt % to 30 wt %, preferably 15 wt % to 25 wt %, more preferably 17 wt % to 23 wt %. When the solid content satisfies the above range, aggregation of boehmite particles in the composition may be minimized and also the composition may have a viscosity suitable for forming a coating layer.

The electrode insulating coating composition of the present invention as described above may be prepared by adding and mixing boehmite particles, a dispersant, and a binder in a solvent, and then subjecting the mixture to a dispersion process.

First, the boehmite particles, the dispersant, and the binder are mixed in a solvent to mix each component of the composition. In this case, the mixing may be performed using mixing devices well known in the art, for example, a homomixer, and the like, but is not limited thereto.

Then, the composition subjected to the mixing process is milled and dispersed. The milling may be performed using ball mill, bead mill, or basket mill, and more specifically, may be performed using bead mill.

Meanwhile, extent of dispersion of the composition may be controlled by regulating milling conditions such as the number of times the composition passes through the ball mill, bead mill, or basket mill (hereinafter referred to as "number of passes"), and rotor speed.

According to an embodiment of the present invention, $D_{50}$ of solid particles in the composition may be 0.4 μm to 1.3 μm, preferably 0.4 μm to 1.0 μm, more preferably 0.4 μm to 0.7 μm. In this case, the solid particles may include at least any one of boehmite particles, a dispersant, and a binder. Specifically, the solid particles may be in a form in which the boehmite particles are bonded or in a form in which the dispersant and/or the binder are bonded to the boehmite particles.

When the particle size of the solid particles in the composition satisfies the above range, dispersibility of the boehmite particles in the composition may be improved to significantly increase coatability and adhesion of the insulating coating layer.

Meanwhile, the extent of dispersion of the solid particles in the composition may be controlled by regulating solid content in the composition, the type and amount of a dispersant, and/or dispersion process conditions.

Electrode

Hereinafter, an electrode including the insulating coating layer according to the present invention will be described.

The electrode includes a collector, an electrode active material layer, and an insulating coating layer. The electrode active material layer and the insulating coating layer may be disposed on the collector. In this case, the insulating coating layer may be formed of the electrode insulating coating composition described above.

The collector is not particularly limited as long as it has conductivity without causing chemical changes in batteries. For example, copper, stainless steel, aluminum, nickel, titanium, fired carbon, or aluminum or stainless steel that is surface-treated with one of carbon, nickel, titanium, silver, or the like may be used as the collector.

Moreover, the electrode active material layer may be a positive electrode active material layer including a positive electrode active material or a negative electrode active material layer including a negative electrode active material.

As the positive electrode active material, positive electrode active materials well known in the art may be used without limitation, and for example, lithium cobalt-based oxide, lithium nickel-based oxide, lithium manganese-based oxide, lithium iron phosphate, lithium nickel manganese cobalt-based oxide, or a combination thereof may be used. To be specific, as the positive electrode active material, $LiCoO_2$, $LiNiO_2$, $LiMn_2O_4$, $LiCoPO_4$, $LiFePO_4$, and $LiNi_aMn_bCo_cO_2$ (where, 0<a, b, c<1 is satisfied), and the like may be used, but the positive electrode active material is not limited thereto.

The negative electrode active material may be, for example, one kind or at least two kinds selected from the group consisting of natural graphite, artificial graphite, a carbonaceous material; a lithium-containing titanium composite oxide (LTO), metals (Me): Si, Sn, Li, Zn, Mg, Cd, Ce, Ni, or Fe; an alloy formed of the metals (Me); an oxide ($MeO_x$) formed of the metals (Me); and a composite of the metals (Me) and carbon.

Meanwhile, the electrode active material layer may further include a conductive material and a binder, in addition to a positive electrode active material and a negative electrode active material.

The conductive material, so long as having conductivity without causing chemical changes in batteries, may be used without particular limitation, and may employ, for example, a conductive material, such as: graphite; carbon black such as acetylene black, Ketjen black, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives. Specific examples of a commercially available conductive material may include acetylene black series such as products manufactured by Chevron Chemical or Denka black manufactured by Denka Singapore private limited, products manufactured by Gulf Oil, Ketjen black, EC series manufactured by Armak, Vulcan XC-72 manufactured by Cabot, and Super P manufactured by Timcal.

The binder is a component that assists in binding between an active material and a conductive material and in binding with a collector, and is generally added in an amount of 1 wt % to 30 wt % with respect to a total weight of a mixture containing a positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated EPDM, styrene-butadiene rubber, fluorine rubber, various copolymers thereof, and the like.

Next, the above-described electrode insulating coating composition is applied onto the collector and then dried to form the insulating coating layer.

The insulating coating layer may be formed on a non-coated portion on the collector, on which the electrode active material layer is not formed. In this case, the insulating coating layer may be formed to partially overlap an end of the electrode active material layer.

The insulating coating layer may be formed to have a predetermined thickness on the collector and the electrode active material layer. In this case, the insulating coating layer may have a thickness of 10 μm to 30 μm, preferably 15 μm to 25 μm, and more preferably 17 μm to 23 μm. When the thickness of the insulating coating layer satisfies the above range, adhesion of the insulating coating layer to the collector and/or the electrode active material layer may be further improved.

Meanwhile, the insulating coating layer according to an embodiment of the present invention has excellent coatability and adhesion compared to typical insulating coating layers. Specifically, the insulating coating layer has a uniform thickness and/or surface, and thus has excellent coatability. In addition, the boehmite particles are uniformly dispersed on the insulating coating layer, and accordingly, the binder is sufficiently present under the insulating coating layer, and thus the insulating coating layer has excellent adhesion.

Hereinafter, the present invention will be described in more detail with reference to Examples. However, the following Examples are for illustrative purposes only to describe the present invention and are not intended to limit the scope of the present invention.

Example 1

BYK®-P104 manufactured by BYK was prepared as a dispersant. The BYK®-P104 includes a mixture of fatty acid compounds in which oleic acid, stearic acid, palmitic acid, and nervonic acid are mixed in a weight ratio of (9 to 10):(9 to 10):(9 to 10):(8 to 9) in an amount of 50 parts by weight with respect to a total weight, and include a solvent in which xylene, ethylbenzene, and isobutyl ketone are mixed in a weight ratio of 65:27:8 in an amount of 50 parts by weight with respect to a total weight.

80 parts by weight of NMP solution as a solvent, 17 parts by weight of boehmite (product name: ACTILOX200SM, manufacturer: Nabaltec) having a $D_{50}$ of 0.2 μm and a specific surface area of 17 $m^2/g$, 0.3 parts by weight of BYK-P104 (product name) as a dispersant, and 2.7 parts by weight of PVdF (product name: KF9700, manufacturer: KUREHA) as a binder were mixed to prepare 1 kg of a mixture, and the mixture was subjected to mixing for 1 hour using a homomixer (product name: Dispermat LC, manufacturer: VMA).

Next, using bead mill (product name: LS-1, manufacturer: Netzsch), a dispersing process is performed at a rotor speed of 3300 RPM, a discharge amount of 540 g/min for 1 pass, and with 7 passes to prepare an electrode insulating coating composition.

Example 2

An electrode insulating coating composition was prepared in the same manner as in Example 1, except that 0.6 parts by weight of the dispersant and 2.4 parts by weight of the binder were mixed, and the dispersion process was performed with 6 passes.

Example 3

An electrode insulating coating composition was prepared in the same manner as in Example 1, except that 1 part by weight of the dispersant and 2 parts by weight of the binder were mixed, and the dispersion process was performed with 4 passes.

Example 4

An electrode insulating coating composition was prepared in the same manner as in Example 2, except that the dispersion process was performed with 8 passes.

Example 5

An electrode insulating coating composition was prepared in the same manner as in Example 2, except that the dispersion process was performed with 4 passes.

Comparative Example 1

An electrode insulating coating composition was prepared in the same manner as in Example 4, except that a dispersant was not used and 3 parts by weight of the binder was mixed.

Comparative Example 2

An electrode insulating coating composition was prepared in the same manner as in Example 4, except that H-NBR (product name: THERBAN® 3400, manufacturer: ARLANXEO) was used instead of BYK-P104 as a dispersant.

Comparative Example 3

An electrode insulating coating composition was prepared in the same manner as in Example 4, except that 0.1 parts by weight of the dispersant and 2.9 parts by weight of the binder were mixed.

Comparative Example 4

An electrode insulating coating composition was prepared in the same manner as in Example 3, except that 2 parts by weight of the dispersant and 1 part by weight of the binder were mixed.

Comparative Example 5

An electrode insulating coating composition was prepared in the same manner as in Example 2, except that alumina (product name: AES-11, manufacturer: Sumitomo) was used instead of boehmite as inorganic particles.

TABLE 1

| | Composition | | | | | | Dispersion |
|---|---|---|---|---|---|---|---|
| | Inorganic particles | | Dispersant | | Binder (PVdF) | Solvent (NMP) | |
| | Type | Amount (wt %) | Type | Amount (wt %) | Amount (wt %) | Amount (wt %) | process No. of passes |
| Example 1 | Bohemite | 17 | P104 | 0.3 | 2.7 | 80 | 7 |
| Example 2 | Bohemite | 17 | P104 | 0.6 | 2.4 | 80 | 6 |
| Example 3 | Bohemite | 17 | P104 | 1 | 2 | 80 | 4 |

TABLE 1-continued

| | Composition | | | | | | |
|---|---|---|---|---|---|---|---|
| | Inorganic particles | | Dispersant | | Binder (PVdF) | Solvent (NMP) | Dispersion |
| | Type | Amount (wt %) | Type | Amount (wt %) | Amount (wt %) | Amount (wt %) | process No. of passes |
| Example 4 | Bohemite | 17 | P104 | 0.6 | 2.4 | 80 | 8 |
| Example 5 | Bohemite | 17 | P104 | 0.6 | 2.4 | 80 | 4 |
| Comparative Example 1 | Bohemite | 17 | None | 0 | 3 | 80 | 8 |
| Comparative Example 2 | Bohemite | 17 | H-NBR | 0.6 | 2.4 | 80 | 8 |
| Comparative Example 3 | Bohemite | 17 | P104 | 0.1 | 2.9 | 80 | 8 |
| Comparative Example 4 | Bohemite | 17 | P104 | 2 | 1 | 80 | 4 |
| Comparative Example 5 | Alumina | 17 | P104 | 0.6 | 2.4 | 80 | 6 |

Experimental Example 1—Measurement of Particle Size

Using a particle size analyzer (product name: MASTERSIZER 3000, manufacturer: Malvern), particle sizes $D_{10}$, $D_{50}$, and $D_{90}$ (μm) of particles in electrode insulating coating compositions prepared in Examples 1 to 5 and Comparative Examples 1 to 5 were measured. The measurement results are shown in Table 2 below.

Experimental Example 2—Measurement of Viscosity

Viscosity of each electrode insulating coating composition prepared in Examples 1 to 5 and Comparative Examples 1 to 5 was measured and the measurement results are shown in Table 2 below.

The viscosity of the composition was measured using a viscometer (product name: viscometer TV-22, manufacturer: TOKI) at 25° C. and 1 rpm.

Experimental Example 3—Evaluation of Storage Stability (Aggregation Properties)

Each electrode insulating coating composition prepared in Examples 1 to 5 and Comparative Examples 1 to 5 was stored in a 50 ml vial for 24 hours, and then visually observed on precipitation and evaluated as follows. The evaluation results are shown in Table 2.

O: No precipitation observed.

X: precipitation observed.

Experimental Example 4—Evaluation of Coatability

Electrode insulating coating compositions prepared in Examples 1 to 5 and Comparative Examples 4 and 5 were applied onto aluminum foil to have a thickness of 20 μm and then dried to form an insulating coating layer.

The formed insulating layer was visually observed to determine the presence or absence of defects, and evaluated as follows. The evaluation results are shown in Table 2 below.

O: No crater due to poor linearity and air bubbles observed.

X: Crater due to poor linearity or bubbles observed.

Meanwhile, the electrode insulating coating compositions of Comparative Examples 1 to 3 showed excessively high viscosity to prevent an insulating coating layer from being formed through coating.

Experimental Example 5—Evaluation of Adhesion

The electrode insulating coating compositions prepared in Examples 1 to 5 and Comparative Examples 4 and 5 were applied onto aluminum foil to have a thickness of 20 μm, dried to form an insulating coating layer, and the insulating coating layer was cut to a size of 20 mm×100 mm, and then impregnated in an electrolyte ($LiPF_6$ 1M, EC/EMC=3/7 (vol %)) at 60° C. for 24 hours, and the presence or absence of deintercalation from the aluminum foil substrate was visually observed and evaluated as follows. The evaluation results are shown in Table 2.

O: No deintercalation or lifting observed.

X: Deintercalation or lifting observed.

Meanwhile, the electrode insulating coating compositions of Comparative Examples 1 to 3 showed excessively high viscosity to prevent an insulating coating layer from being formed through coating.

Figure 2:
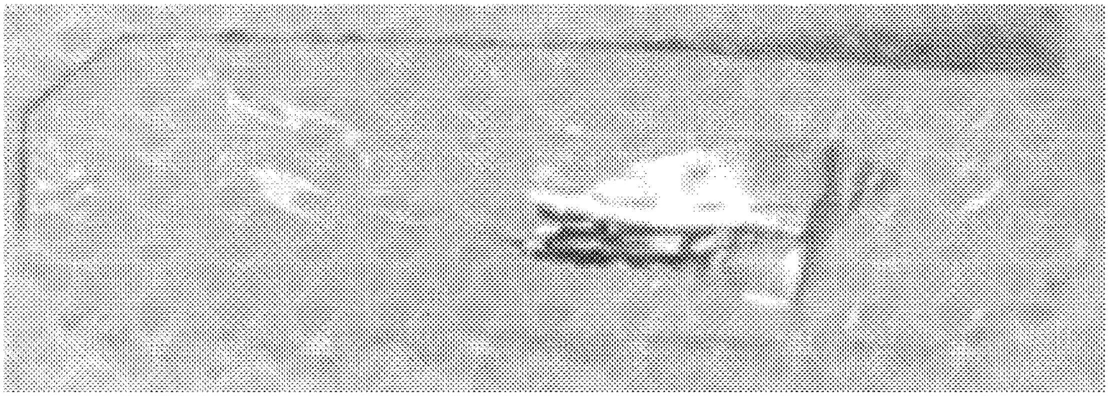
FIG. 2 is an image showing a state of an insulating coating layer formed using an electrode insulating coating composition of Comparative Example 5 after electrolyte impregnation.

FIG. 1 is an image showing a state of an insulating coating layer formed using an electrode insulating coating composition of Example 2 after electrolyte impregnation, and FIG. 2 is an image showing a state of an insulating coating layer formed using an electrode insulating coating composition of Comparative Example 5 after electrolyte impregnation.

FIGS. 1 and 2 show that in an insulating coating layer formed of the electrode insulating coating composition of Example 2 using boehmite as inorganic particles, the coating layer was maintained even after electrolyte impregnation with no deintercalation or lifting, whereas an insulating coating layer formed of the electrode insulating coating composition of Comparative Example 5 using alumina showed deintercalation or lifting after electrolyte impregnation.

TABLE 2

| Composition | Electrode insulating coating composition D10 (μm) | D50 (μm) | D90 (μm) | Viscosity (cps) | Storage stability | Coating properties Coatability | Adhesion |
|---|---|---|---|---|---|---|---|
| Example 1 | 0.24 | 0.6 | 1.37 | 240 | ○ | ○ | ○ |
| Example 2 | 0.22 | 0.56 | 1.3 | 220 | ○ | ○ | ○ |
| Example 3 | 0.21 | 0.53 | 1.2 | 180 | ○ | ○ | ○ |
| Example 4 | 0.19 | 0.42 | 1.03 | 170 | ○ | ○ | ○ |
| Example 5 | 0.25 | 0.65 | 1.48 | 290 | ○ | ○ | ○ |
| Comparative Example 1 | 20.5 | 78.4 | 207 | 8800 or greater | X | — | — |
| Comparative Example 2 | 1.79 | 6.18 | 31.7 | 5500 | X | — | — |
| Comparative Example 3 | 0.41 | 2.19 | 10.1 | 1200 | X | — | — |
| Comparative Example 4 | 0.19 | 0.43 | 1.01 | 110 | ○ | X | X |
| Comparative Example 5 | 0.25 | 0.62 | 1.45 | 210 | ○ | ○ | X |

Table 2 above shows that the electrode insulating coating compositions of Examples 1 to 5 in which boehmite is used as inorganic particles and two or more saturated fatty acid compounds are used as a dispersant, and the dispersant is included in an amount of 1.2 to 8.8 parts by weight with respect to 100 parts by weight of the boehmite particles have low particle aggregation in the compositions, excellent storage stability, and excellent coatability. In addition, it is determined that when an insulating coating layer is formed using the electrode insulating coating compositions of Examples 1 to 5, excellent adhesion is maintained even after electrolyte impregnation.

On the contrary, the electrode insulating coating composition of Comparative Example 1 in which a dispersant was not used, had excessive particle aggregation in the composition, and thus had excessively high viscosity to prevent the coating process from being performed.

In addition, the electrode insulating coating composition of Comparative Example 2 in which H-NBR was used as a dispersant showed lower particle aggregation and viscosity than Comparative Example 1, but still had excessively high viscosity to prevent the coating process from being performed.

Meanwhile, the electrode insulating coating compositions of Comparative Examples 3 and 4 in which viscosity of the electrode insulating coating compositions was out of the range of the present invention had deterioration in coatability, adhesion, and/or storage stability.

In addition, as shown in FIG. 2 and Table 2, when an insulating coating layer was formed using the electrode insulating coating composition of Comparative Example 5 using alumina instead of boehmite as inorganic particles, adhesion to a collector after electrolyte impregnation was remarkably degraded.

The invention claimed is:

1. An electrode comprising a collector, an electrode active material layer, and an insulating coating layer,
   wherein the electrode active material layer and the insulating coating layer are disposed on the collector,
   wherein the insulating coating layer is formed from an electrode insulating coating composition,
   wherein the insulating coating layer is disposed on a surface of the collector on which the electrode active material layer is not disposed,
   wherein the electrode insulating coating composition comprises:
      boehmite particles;
      a dispersant;
      a binder; and
      a solvent,
   wherein the dispersant comprises two or more fatty acid compounds, and is included in an amount of 1.2 to 8.8 parts by weight with respect to 100 parts by weight of the boehmite particles.

2. The electrode of claim 1, wherein each of the two or more fatty acid compounds has different carbon numbers from each other.

3. The electrode of claim 1, wherein the two or more fatty acid compounds comprise a C15 to C30 unsaturated fatty acid compound and a C15 to C30 saturated fatty acid compound.

4. The electrode of claim 3, wherein the C15 to C30 unsaturated fatty acid compound comprises a compound chosen from oleic acid, palmitoleic acid, cis-heptadecenoic acid, vaccenic acid, elaidic acid, linolenic acid, arachidonic acid, eicosanoic acid, erucic acid, eicosapentaenoic acid (EPA), docosahexaenoic acid (DHA), and nervonic acid.

5. The electrode of claim 3, wherein the C15 to C30 saturated fatty acid compound comprises a compound chosen from palmitic acid, stearic acid, arachidic acid, behenic acid, and lignoceric acid.

6. The electrode of claim 3, wherein the dispersant comprises oleic acid, stearic acid, palmitic acid, and nervonic acid.

7. The electrode of claim 6, wherein the dispersant comprises the oleic acid, the stearic acid, the palmitic acid, and the nervonic acid in a weight ratio of (5 to 25):(5 to 25):(5 to 25):(5 to 25).

8. The electrode of claim 1, wherein the binder comprises polyvinylidene fluoride.

9. The electrode of claim 1, wherein the solvent comprises one chosen from acetone, tetrahydrofuran, acetonitrile, dimethylformamide, dimethyl sulfoxide, dimethylacetamide, and N-methyl-2-pyrrolidone (NMP).

10. The electrode of claim 1, wherein with respect to 100 parts by weight of the electrode insulating coating composition, the electrode insulating coating composition comprises:

the boehmite particles in an amount of 10 to 25 parts by weight;

the dispersant in an amount of 0.2 to 1.5 parts by weight;

the binder in an amount of 1 to 5 parts by weight; and the solvent in an amount of 70 to 90 parts by weight.

11. The electrode of claim 1, wherein the electrode insulating coating composition has a solid content of 10 wt % to 30 wt %.

12. The electrode according to claim 1, wherein the insulating coating layer is disposed at an end of the electrode active material layer.

* * * * *